(12) United States Patent
Andersson

(10) Patent No.: US 12,183,121 B2
(45) Date of Patent: Dec. 31, 2024

(54) METHOD FOR GENERATING A VIDEO COMPRISING BLINK DATA OF A USER VIEWING A SCENE

(71) Applicant: Tobii AB, Danderyd (SE)

(72) Inventor: Richard Andersson, Danderyd (SE)

(73) Assignee: Tobii AB, Danderyd (SE)

( * ) Notice: Subject to any disclaimer, the term of this patent is extended or adjusted under 35 U.S.C. 154(b) by 47 days.

(21) Appl. No.: 18/152,079

(22) Filed: Jan. 9, 2023

(65) Prior Publication Data

US 2023/0237846 A1    Jul. 27, 2023

(30) Foreign Application Priority Data

Dec. 22, 2021 (SE) .................... 2151596-0

(51) Int. Cl.
*G06V 40/18* (2022.01)
*G06F 3/01* (2006.01)
*H04N 5/265* (2006.01)
*G06V 40/20* (2022.01)
*G06V 40/30* (2022.01)

(52) U.S. Cl.
CPC ............ *G06V 40/193* (2022.01); *G06F 3/013* (2013.01); *H04N 5/265* (2013.01)

(58) Field of Classification Search
CPC ...... G06F 3/013; G06V 40/18; G06V 40/193; G06V 40/20; G06V 40/30; H04N 5/265
USPC ............................ 348/78, 61, 169
See application file for complete search history.

(56) References Cited

U.S. PATENT DOCUMENTS

| | | | |
|---|---|---|---|
| 8,885,882 B1 * | 11/2014 | Yin | G06V 40/19 382/103 |
| 9,035,874 B1 | 5/2015 | Fowers et al. | |
| 9,568,997 B2 * | 2/2017 | Wilairat | H04N 5/85 |
| 2012/0131491 A1 * | 5/2012 | Lee | G06F 3/013 715/776 |
| 2012/0146891 A1 * | 6/2012 | Kalinli | H04N 19/33 345/156 |
| 2013/0257709 A1 | 10/2013 | Raffle et al. | |
| 2015/0301594 A1 | 10/2015 | Kitazawa et al. | |

(Continued)

FOREIGN PATENT DOCUMENTS

| | | |
|---|---|---|
| CN | 108762504 | 11/2018 |
| CN | 113672080 | 6/2021 |
| EP | 3272277 | 1/2018 |

OTHER PUBLICATIONS

SE2151596-0, "Search Report", Sep. 20, 2022, 10 pages.

*Primary Examiner* — Daquan Zhao
(74) *Attorney, Agent, or Firm* — Christopher Ignatius Moylan

(57) ABSTRACT

A method performed by a computer for generating a video comprising blink data of a user viewing a scene depicted as video data, where the blink data is overlayed on the video data. The method includes receiving sensor data. The sensor data includes at least the video data including at least one video frame, and gaze tracking data at least indicative of viewed positions within the scene depicted by at least one video frame of the video data. The method includes processing the sensor data to generate blink data indicative of blink motion of at least one eye of the user. The method includes generating a video overlay by rendering the blink data. generating an output video by mixing the video data and the video overlay.

15 Claims, 9 Drawing Sheets

(56) References Cited

U.S. PATENT DOCUMENTS

2018/0008141 A1 1/2018 Krueger
2020/0019238 A1 1/2020 Agaoglu et al.

* cited by examiner

METHOD FOR GENERATING A VIDEO COMPRISING BLINK DATA OF A USER VIEWING A SCENE

CROSS-REFERENCES TO RELATED APPLICATIONS

The present application claims priority to Swedish patent application No. 2151596-0, filed Dec. 22, 2021, and is hereby incorporated by reference in its entirety.

TECHNICAL FIELD

The present application relates to user gaze detection systems and methods. In particular, the present application relates to user gaze detection systems configured to generate video comprising blink data of a user viewing a scene.

OBJECTS OF THE INVENTION

An objective of embodiments of the present invention is to provide a solution which mitigates or solves the drawbacks described above.

BACKGROUND

Interaction with computing devices is a fundamental action in today's world. Computing devices, such as personal computers, tablets, and smartphones, are found throughout daily life. The systems and methods for interacting with such devices define how they are used and what they are used for.

Advances in eye/gaze tracking technology have made it possible to interact with a computer/computing device using a person's gaze information. For example, the location on a display or real-world scene that the user is gazing at/viewing may be used as input to the computing device. This input can be used for interaction solely, or in combination with a contact-based interaction technique (e.g., using a user input device, such as a keyboard, a mouse, a touch screen, or another input/output interface).

A problem with monitoring gaze information is that blinking of the eye occurs, thereby temporarily blinding the person and interrupting the gaze and flow of gaze information. Blinking is part of normal eye behavior. The person normally does not perceive the blink, as the brain partly suppresses visual perception at the time of the blink. However, blinking may cause the person to not perceive a brief/transient event in a viewed scene. This makes it relevant to include information about the blink not only in quantitative analyses, but also in qualitative analyses.

Thus, there is a need for an improved method for generating video comprising blink data of a user viewing a scene.

SUMMARY OF THE INVENTION

The above objective is achieved by the subject matter described herein. Further advantageous implementation forms of the invention are described herein.

According to a first aspect of the invention the objects of the invention are achieved by a method performed by a computer for generating a video comprising blink data of a user viewing a scene depicted as video data, where the blink data is overlayed on the video data, the method comprising receiving sensor data, from one or more sensor units, wherein the sensor data at least comprises the video data, comprising at least one video frame, and gaze tracking data at least indicative of viewed positions within the scene depicted by the at least one video frame of the video data, processing the sensor data to generate blink data indicative of blink motion of at least one eye of the user, generating a video overlay by rendering the blink data, and generating an output video by mixing the video data and the video overlay.

At least one advantage of the first aspect of the invention is that analysis of scenes depicted by video is improved by conveying blink information.

In one embodiment of the first aspect, the video overlay at least partially occludes the video data in the mixed video data.

In one embodiment of the first aspect, the sensor data further comprises eye openness data indicative of a grade of openness of the at least one eye of the user at a particular time.

In one embodiment of the first aspect, the blink data is generated dependent on the eye openness data.

In one embodiment of the first aspect, processing the sensor data comprises generating time stamped and/or normalized values of the eye openness data in the range [0-1].

In one embodiment of the first aspect, processing the sensor data comprises generating blink data using time, a predetermined blink interval and a predetermined blink motion model.

In one embodiment of the first aspect, processing the sensor data comprises determining that the gaze tracking data is indicative of data loss and/or a quality measure of the gaze tracking data being below a quality threshold, and generating blink data using time, and a predetermined blink motion model. In one example, before data loss occurs or the detection of the pupil is lost, there is usually some disruption to the estimated pupil diameter, or sudden shifts of the estimated gaze position. The quality measure may, for example be defined as differential or delta values between subsequent values of estimated pupil diameter or between subsequent values of the estimated gaze position.

In one embodiment of the first aspect, a degree of occlusion by the overlay of the video data in the mixed video data is dependent on the blink data.

In one embodiment of the first aspect, the overlay is rendered as centered on one of the viewed positions.

In one embodiment of the first aspect, rendering the video overlay comprises rendering the blink data as a shutter like pattern.

In one embodiment of the first aspect, the shutter like pattern is rendered in the form of an eyelid like shape, a diaphragm shutter or a focal-plane shutter.

According to a second aspect of the invention the objects of the invention are achieved by a method performed by a system for generating a video comprising blink data of a user viewing a scene depicted as video data, wherein the blink data is overlayed on the video data. The system comprises a first computer and a second computer. The method comprises sending sensor data to the second computer by the first computer and performing the method according to the first aspect by the second computer.

According to a third aspect of the invention the objects of the invention are achieved by a sensor unit for generating a video comprising blink data of a user viewing a scene depicted as video data. The blink data is overlayed on the video data. The sensor unit comprises one or more sensors configured to capture sensor data, and a computer. The computer comprises a processor and a memory. Said memory contains instructions executable by said processor. Said computer is operative to perform the method according to the first aspect.

According to a fourth aspect of the invention the objects of the invention are achieved by system for generating a video comprising blink data of a user viewing a scene depicted as video data, where the blink data is overlayed on the video data. The system comprises at least one sensor unit comprising one or more sensors configured to capture sensor data. The sensor data at least comprises the video data. The video data comprises at least one video frame. The sensor data further comprises gaze tracking data at least indicative of viewed positions within the scene depicted by the at least one video frame of the video data. The sensor unit further comprises a first computer coupled to the sensors via a communications interface. The system further comprises a second computer communicatively coupled to the first computer via a communications interface. The first computer is operative/configured to send sensor data to the second computer. The second computer is operative to perform the method according to the first aspect.

According to a fifth aspect of the invention the objects of the invention are achieved by a computer program comprising computer-executable instructions for causing a computer, when the computer-executable instructions are executed on processing circuitry comprised in the computer, to perform the method steps according to the first or second aspect.

According to a sixth aspect of the invention, the objects of the invention are achieved by a computer program product comprising a computer-readable storage medium, the computer-readable storage medium having the computer program according to the fifth aspect embodied therein.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
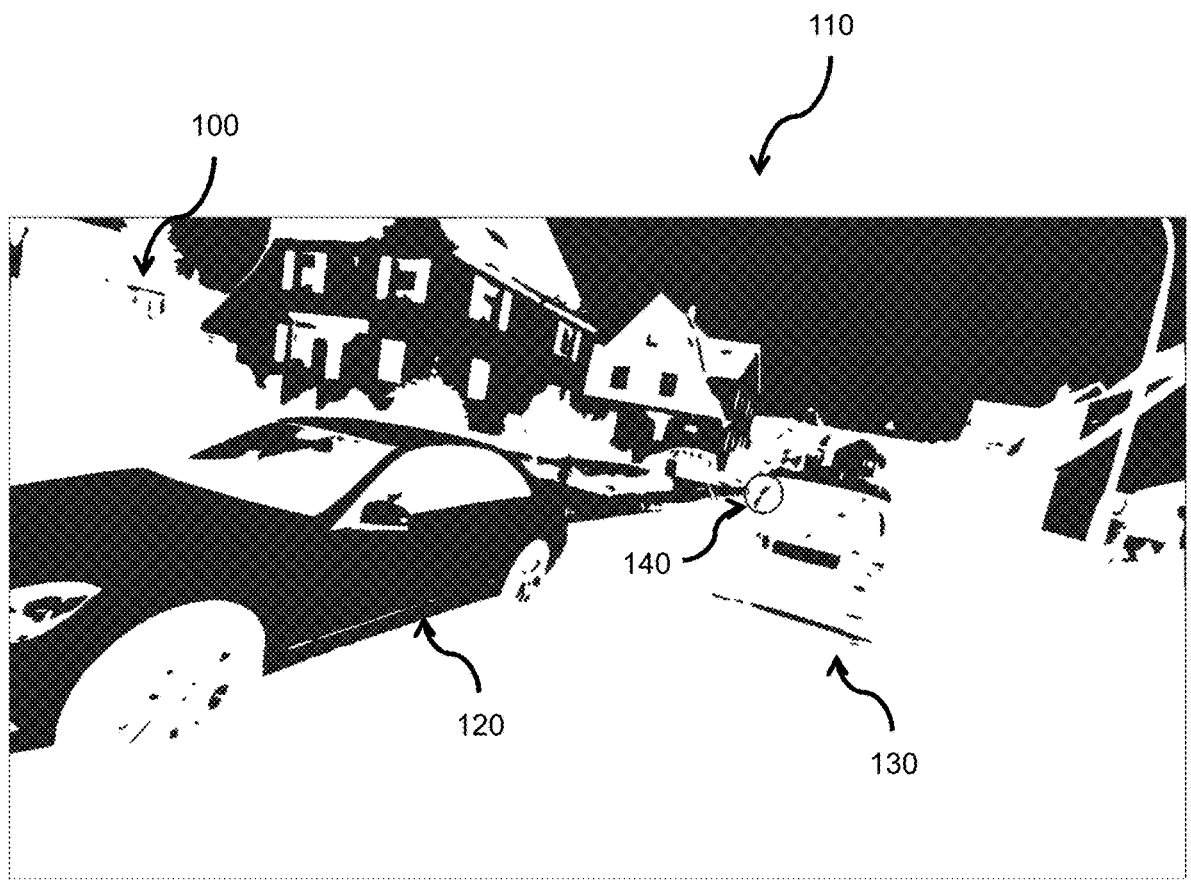
FIG. 1 shows a scene depicted as a video frame of video data according to one or more embodiments of the present disclosure.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION OF THE INVENTION

An "or" in this description and the corresponding claims is to be understood as a mathematical OR which covers "and" and "or" and is not to be understand as an XOR (exclusive OR). The indefinite article "a" in this disclosure and claims is not limited to "one" and can also be understood as "one or more", i.e., plural.

This invention relates to the qualitative analysis of video and/or video data. The main concept is to visualize, in the gaze-overlaid scene, a video representation related to the blinking behavior, i.e., to mix video data of a depicted scene, gaze data indicative of gaze coordinates, and blink information/data. One purpose is to allow an observer of this mixed video to better understand how a participant missed a transient event in the viewed scene, and to allow for better immersion in the situation.

This is, in some embodiments, achieved by an overlay occluding the video of the viewed scene. The overlay may e.g., comprise simulated eyelids that rapidly close and open in sync with the real blink of the user. This can be achieved by utilizing an eye openness stream from an eye tracker, by simulation of blink behavior, or by determining when gaze data is indicating invalid track status/loss of data.

The term "video" used herein denotes an electronic medium for the recording, copying, playback, broadcasting, and display of moving visual media. The video comprises one or a plurality of subsequent video frames. Each video frame comprises a representation of a field of view of a scene. The representation comprises a plurality of pixels arranged to a particular aspect ratio, and a particular resolution. The video may be conveyed/transmitted using variety of media such as wired transfer, wireless broadcasting, recordable media, and network streaming. Any suitable communications network may be used to convey/transmit the video.

FIG. 1 shows a scene 100 depicted as a video frame 110 of video data according to one or more embodiments of the present disclosure. The scene 100 comprises multiple objects 120, 130, e.g., cars driving along a residential street. The scene 100 is captured as at least one video frame 110 of video data, for example, captured by a video camera or generated by a computer.

The video data may comprise a single frame and/or multiple frames subsequent in time.

Overlayed onto the at least one video frame 110 is gaze tracking data at least indicative of viewed positions 140 within the scene 100 or the at least one video frame 110 of the video data. In the example in FIG. 1, a circle is used to indicate a viewed position 140, but any suitable pointer may be considered, e.g., an arrow, an X symbol, a square, etc.

The scene 100 may, for example, be depicted as a video frame 110 of video data, where the video frame is generated by a camera, by a computer such as a game console or general-purpose computer, or any other video source.

FIG. 2A-D illustrates sensor units in various applications of the present invention. Sensor units are further described in relation to FIG. 6.

Figure 2A:
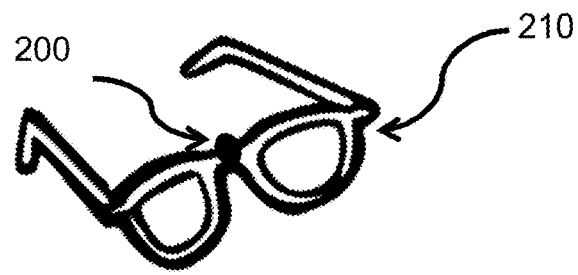
FIG. 2A-D illustrates sensor units in various applications of the present invention.

In FIG. 2A, an application with a mobile sensor unit 210 is illustrated, e.g., glasses/goggles provided with sensors 200. This application may, for example, be used for qualitative inspection by researcher, professional performance evaluation and training, sport psychology and sports training, car driving studies, police and military training, e.g., inspecting behavior of a user in a traffic environment, such as the one illustrated in FIG. 1.

In this application, the scene 100 is typically depicting a real-world scene captured by a sensor comprised in the mobile sensor unit 210 and having a particular field of view, such as a scene camera or video camera.

Figure 2B:
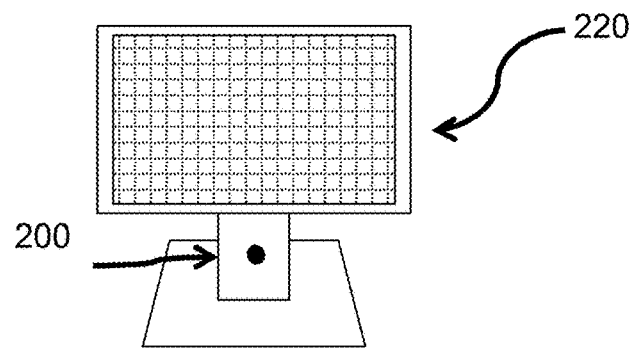

In FIG. 2B an application with a stationary sensor unit 220 is illustrated, e.g., a video screen provided with sensors 200. This may, for example, be used for monitoring of E-sports, where the audience may be provided with a better understanding of why a player was killed by a suddenly emerging enemy when they see in the generated video that the player was blinking at that moment.

In this application, the scene 100 is depicting a simulated scene, typically a video frame generated by a gaming device, such as a general-purpose computer or dedicated gaming device. The scene can also be a mixture of a depicted real-world scene and a simulated scene, such as in augmented reality applications.

Figure 2C:
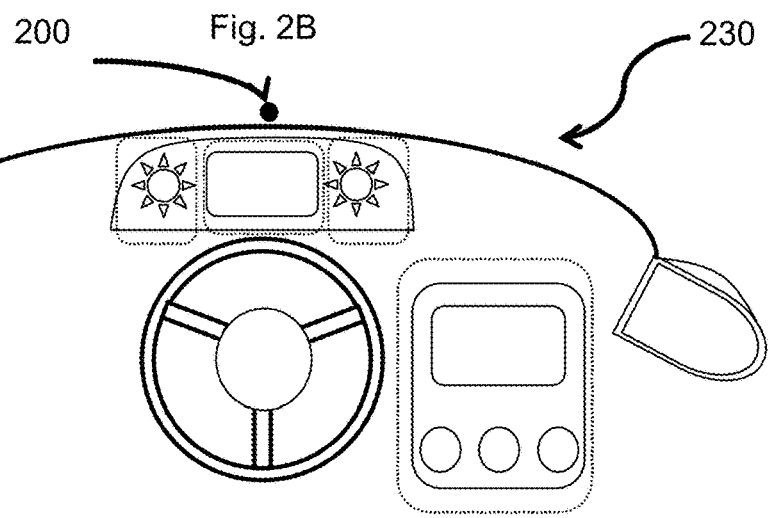

In FIG. 2C an application with a vehicular sensor unit 230 is illustrated, e.g., a vehicle dashboard provided with sensors 200. This may, for example, be used for analysis and a more easily interpreted video for an insurance claims adjuster or driving instructor to verify whether a driver saw an event or not. In this application, the scene 100 is typically depicting a real-world scene captured by a sensor comprised in the mobile sensor unit 210, such as a scene camera or video camera. The scene can also be a mixture of a depicted real-world scene and a simulated scene, such as in augmented reality applications or by using a heads-up display.

Figure 2D:

In FIG. 2D an application with a machine sensor unit 240 is illustrated, e.g., a machine provided with sensors 200. This may, for example, be used for controlling machines using eye and gaze gestures. The present disclosure could help in troubleshooting or calibrating/setting thresholds for the sensor unit if "real" blinks are visualized and see why a "blink trigger"/control of the machine by a blink is detected or not. In this application, the scene 100 is typically depicting a real-world scene captured by a sensor comprised in the mobile sensor unit 210, such as a scene camera or video camera. The scene can also be a mixture of a depicted real-world scene and a simulated scene, such as in augmented reality applications or by using a heads-up display.

Figure 3:
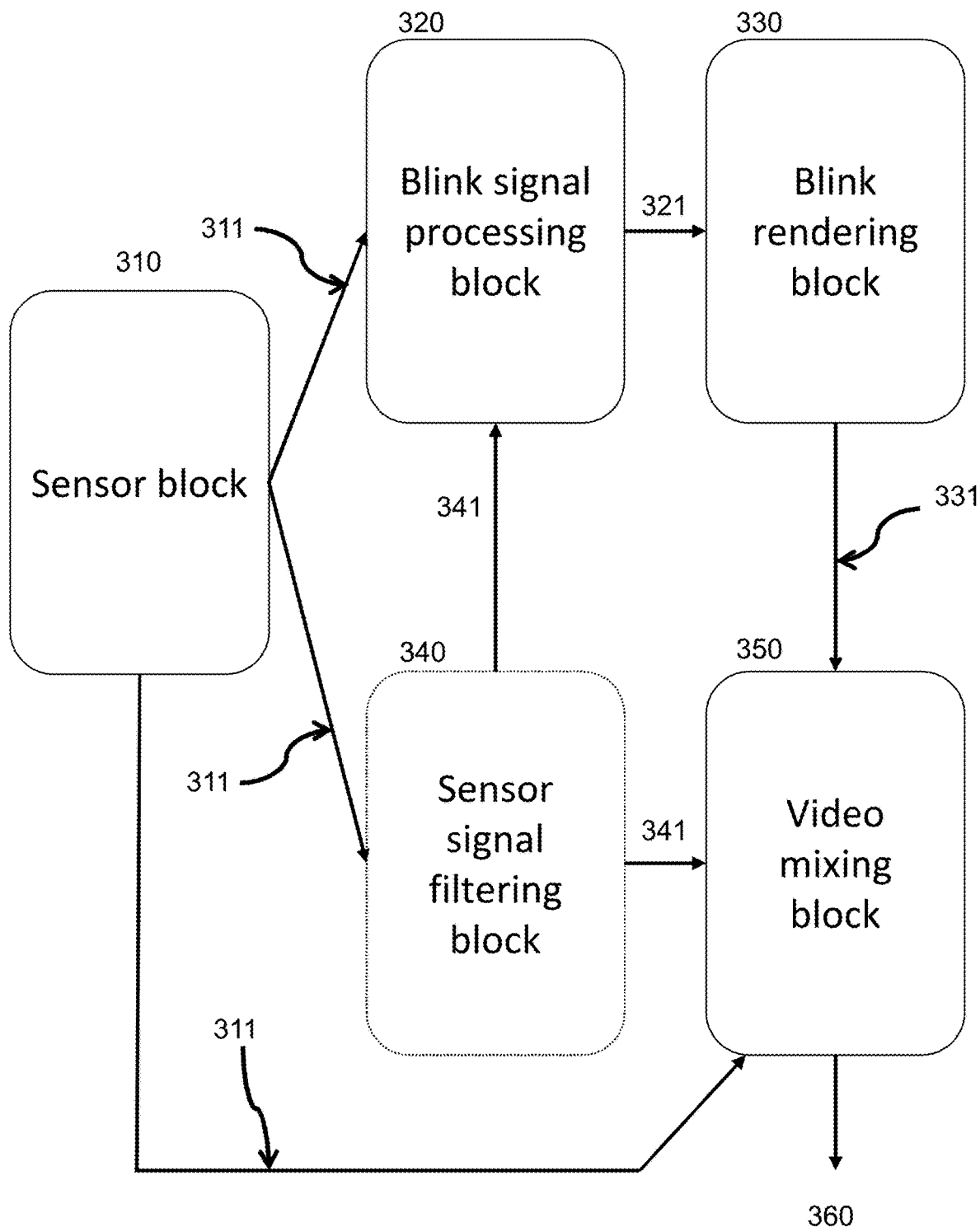
FIG. 3 shows functional blocks according to one or more embodiments according to the present disclosure.

FIG. 3 shows functional blocks 310-350 according to one or more embodiments according to the present disclosure. It is understood that the functionality described below can be divided into further blocks or be integrated into a single block or fewer blocks without departing from the present disclosure. It is further understood that the functionality may be performed by a single unit or be distributed amongst multiple units, such as sensor units 210-240, servers, user devices, etc.

In the sensor block 310, sensor data is received. The sensor data may for example, be received from one or more sensor units 210-240 or received from integrated sensors 200. The sensor data comprises at least video data and gaze tracking data. The video data comprises at least one video frame 110 depicting the scene 100. The gaze tracking data is at least indicative of viewed positions 140 within the scene 100 depicted by the at least one video frame 110 of the video data.

The sensor data may, for example, comprise time, eye position in space (vis-à-vis an eye-tracker in the sensors 200), direction of gaze of the user, pupil diameter of the user, 3D position of where a gaze point of the user intersects with the objects 120, 130 in the real-world or intersects objects on a screen, and eye openness values, e.g., as a millimeter value between the eyelids or as a percentage and/or a maximum or minimum distance between parts of the visualization.

In one example, a mobile sensor unit 210 is capturing video of a scene 100 viewed by a user wearing the mobile sensor unit 210. The mobile sensor unit 210 is further providing gaze tracking data at least indicative of viewed positions 140 within the scene 100/at least one video frame 110 of the video data, e.g., a bike rider wearing glasses provided with a scene camera and gaze tracking sensors.

In one example, a stationary sensor unit 220 is generating video data of a scene 100 viewed by a user on a screen, and where the gaze of the user is tracked as gaze tracking data. The stationary sensor unit 220 is further providing gaze tracking data at least indicative of viewed positions 140 within the scene 100/at least one video frame 110 of the video data. For example, the stationary sensor unit 220 is providing data showing a professional E-gaming player watching a screen whilst playing a game.

In one example, a vehicular sensor unit 230 is capturing video data of a scene 100 viewed by a user. The vehicular sensor unit 230 is further providing gaze tracking data at least indicative of viewed positions 140 within the scene 100/at least one video frame 110 of the video data. For example, the vehicular sensor unit 230 is providing data showing a driver driving a vehicle provided with a scene camera and gaze tracking sensors tracking the drivers gaze and providing gaze tracking data at least indicative of viewed positions 140 within the scene 100/at least one video frame 110 of the video data depicting the scene 100.

In one example, a machine sensor unit 240 is capturing video data of a scene 100 viewed by a user operating the machine sensor unit 240. The machine sensor unit 240 is further providing gaze tracking data at least indicative of viewed positions 140 within the scene 100/at least one video frame 110 of the video data depicting the scene. For example, the machine sensor unit 240 is providing data showing an operator that is operating a machine provided with a scene camera and gaze tracking sensors tracking the drivers gaze and providing gaze tracking data at least indicative of viewed positions 140 within the scene 100 depicted by at least one video frame 110 of the video data depicting the scene 100.

In one embodiment, the received sensor data further comprises eye openness data indicative of a grade of openness of the at least one eye of the user at a particular time. For example, the received sensor data comprises one or more value pairs comprising a time/timestamp and a corresponding degree of openness of the at least one eye of the user.

In one embodiment, processing the sensor data comprises generating blink data using current time, a predetermined blink interval and a predetermined blink motion model 410. The predetermined blink motion may, for example, comprise a plurality of value pairs comprising a normalized time and a corresponding degree of openness of the at least one eye of the user.

In one embodiment, processing the sensor data comprises determining that the gaze tracking data is indicative of data loss (no viewed location in the scene can be determined) and/or a quality measure of the gaze tracking data being below a quality threshold, and generating blink data using time, and a predetermined blink motion model 410. The quality measure may, for example, be defined as differential or delta values between subsequent values of estimated pupil diameter or between subsequent values of the estimated gaze position.

A common reason for data loss or quality measure of the gaze tracking data being below a quality threshold is that the eyelid in a closed position prevents gaze tracking, in particular the detection of the pupil of the eye is prevented.

The predetermined blink motion may, for example, comprise a plurality of value pairs comprising a normalized time and a corresponding degree of openness of the at least one eye of the user. The predetermined blink motion model 410 is further described in relation to FIG. 4.

In the blink signal processing block 320, the sensor data 311 is received directly from the sensor block 310 or the filtered sensor data 341 is received from the sensor signal filtering block 320 The sensor block 310 or the filtered sensor data 341 is further processed to generate blink data indicative of blink motion of at least one eye of the user.

In one example, the blink data is indicative of a plurality of value pairs comprising a time and a corresponding degree of openness of the at least one eye of the user.

In some embodiments, the sensors 200 provide data indicative of a degree of openness of at least one eye of the user.

In one embodiment, processing the sensor data comprises generating the blink data by assigning the value pairs of eye openness data comprised in the sensor data 311 to the value pairs of the blink data.

In some embodiments, the blink motion of the user is simulated or estimated as a periodic event having a predetermined duration.

In one embodiment, processing the sensor data comprises generating blink data using current time, a predetermined blink interval and a predetermined blink motion model 410. The predetermined blink motion may, for example, comprise a plurality of value pairs comprising a normalized time and a corresponding degree of openness of the at least one eye of the user.

In one example, the predetermined blink interval will be used as the trigger of a blink motion. The predetermined blink motion model 410 will be used to generate blink data indicative of a blink motion. The predetermined blink motion model 410 may comprise a plurality of value pairs comprising a normalized time and a corresponding degree of openness of the at least one eye of the user. Once the predetermined blink interval has passed, the generation of blink data can start by periodically providing current time to the predetermined blink motion model 410 and receiving a corresponding degree of openness of the at least one eye of the user.

In some embodiments, the loss of gaze tracking data from an eye tracker is used as a trigger for the start of the blink motion, where the following blink motion of the user is simulated or estimated by using a predetermined blink motion model 410.

In one example, the determination of data loss and/or a quality measure of the gaze tracking data being below a quality threshold will be used as the trigger of a blink motion. The quality measure may, for example, be defined as differential or delta values between subsequent values of estimated pupil diameter or between subsequent values of the estimated gaze position. The predetermined blink motion model 410 may be used to generate blink data indicative of a blink motion, in other words, to generate an animation of the blink motion. The predetermined blink motion model 410 may comprise a plurality of value pairs comprising a normalized time and a corresponding degree of openness of the at least one eye of the user. Once data loss and/or a quality measure of the gaze tracking data being below a quality threshold is detected, the generation of blink data can start by periodically providing current time to the predetermined blink motion model 410 and receiving a corresponding degree of openness of the at least one eye of the user.

In one embodiment, processing the sensor data comprises determining that the gaze tracking data is indicative of data loss (no viewed location in the scene can be determined) and/or a quality measure of the gaze tracking data being below a quality threshold, and generating blink data using time, and a predetermined blink motion model 410. The predetermined blink motion may, for example, comprise a plurality of value pairs comprising a normalized time and a corresponding degree of openness of the at least one eye of the user.

In a further example, pre-determined closing/opening velocities will be used as the trigger of a blink motion. The predetermined blink motion model 410 will be used to generate blink data indicative of a blink motion. When the flow of gaze tracking data is lost, the closing/opening velocities of the last measured values of blink data are matched to closing/opening velocities predetermined blink motion model 410. A continuous blink motion can then be generated, even when the flow of gaze tracking data is lost.

In the blink rendering block 330, the blink data 321 is received from the blink signal processing block 320. The blink rendering block 330 further generates a video overlay 331 by rendering the blink data.

In one example, if the blink data comprises a single value pair, then a single representation is rendered. If the blink data comprises a plurality of value pairs, then a plurality of representations are rendered, effectively forming an animation of a shutter, such as eyelids blinking.

Additionally or alternatively, the overlay is rendered as fully transparent in first parts 710 of the overlay and rendered as semi-transparent or opaque in remaining parts 720 of the overlay.

Additionally or alternatively, the video overlay is rendered as at least partially occluding the video data in the later mixing of video overlay and video data. In other words, the video overlay effectively will be a foreground and the video data will be a background in the following mixing block 350. Additionally or alternatively, the at least partially occluded parts of the video are blacked out and/or dimmed and/or blurred.

Additionally or alternatively, the video overlay is rendered as centered on one of the viewed positions 140. Centering on one of the viewed positions is further described in relation to FIG. 8.

Additionally or alternatively, the video overlay is rendered with a varying degree of occlusion, wherein the varying degree of occlusion is dependent on the blink data 321. In one example, the at least partially occluded parts are rendered darker when the eye is closed and rendered lighter when the eye is nearly fully opened. The varying degree of occlusion is further described in relation to FIG. 9.

The aspects of the varying degree of occlusion and centering on one of the viewed positions may be combined without departing from the present disclosure.

In one embodiment, rendering the video overlay comprises rendering the blink data in an eyelid-like shape. Additionally or alternatively, rendering the blink data in the shape of eyelids comprises rendering the blink data as opposite facing parabolas with a focal length proportional to the blink data, i.e., forming eyelid-like shapes with varying degree of eye-openness. Additionally or alternatively, the overlay is rendered as fully transparent within intersecting parts 710 of the opposite facing parabolas and rendered as semi-transparent or opaque in non-intersecting parts 720 of the opposite facing parabolas. Intersecting parabolas are further described in relation to FIG. 7A-B.

Figure 7A:
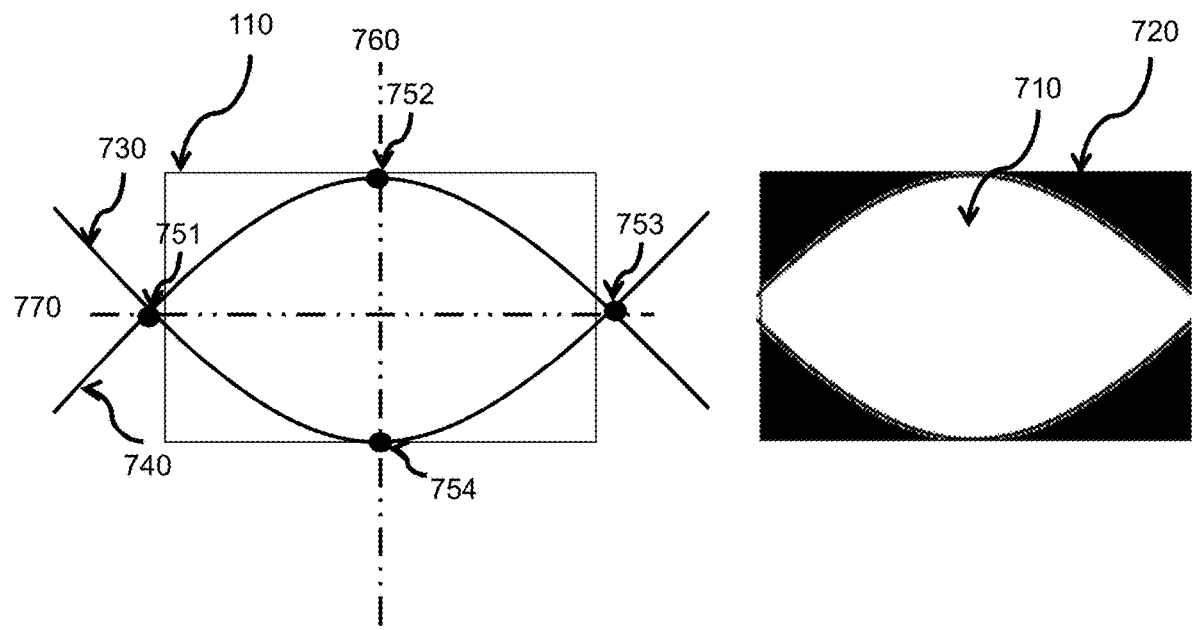
FIG. 7A-B illustrates rendering of a video overlay according to one or more embodiments of the present disclosure.
Figure 7B:
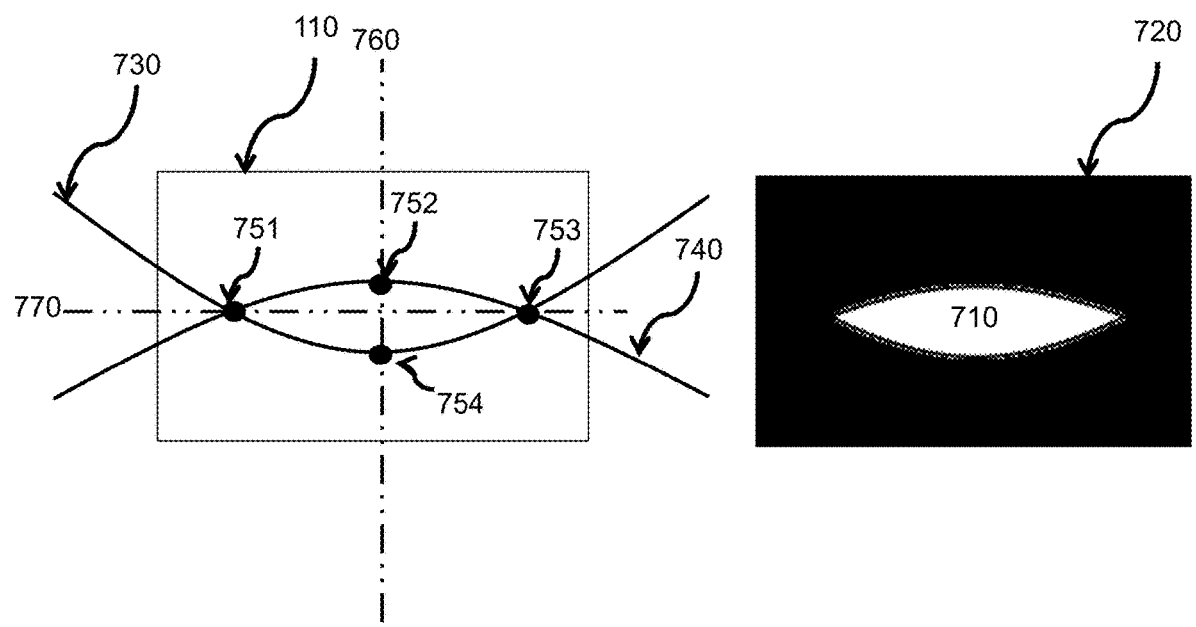

In other words, the blink data is rendered as an area defined by the two intersecting points, FIG. 7A-B items 751, 753, of the two opposite facing parabolas and the corresponding vertex, FIG. 7A-B items 752, 754, of the two opposite facing parabolas. This effectively forms an eyelid-like shape. The entire eyelid-like shape may be rendered, or only the parts of the like shape falling within the video frame 110 may be rendered. Further details are given in relation to FIGS. 7A-B.

In the optional sensor signal filtering block 320, the sensor data 311 is received from the sensor block 310 and filtered. Examples of filtering that may be applied to the sensor data 311 are various types of averaging filters to reduce variability between successive/subsequent samples/frames. The filtered sensor data 341 is then sent to the blink signal processing block 320 and/or the video mixing block 350.

It is understood that any type of temporal filtering may be applied in order to reduce the noise level of the estimated eye openness/eye openness data in order to achieve a more accurate blink detection/estimation, for example, but not limited to, avoiding false positive detection of a blink presence, or to achieve a smoother or otherwise more easily understood blink visualization. This includes but is not limited to filters such as: moving average filters, moving median filters, polynomial-based filters, such as (linear, quadratic, cubic, etc.) splines, or Savitzky-Golay filters. Further, any real-time filtering may be applied, utilizing only data that has been generated up until the given point, and possibly introducing latency to the visualization. Further, any offline filtering may be applied, utilizing data before and after any blink event to enable filtering without shifting the peak closing/opening of the eye in the visualization vis-à-vis its actual occurrence (so-called zero-phase filters).

In the video mixing block 350, the sensor data 311 is received directly from the sensor block 310 or the filtered sensor data 341 is received from the sensor signal filtering block 320. The video mixing block 350 further receives the video overlay 331 from the blink rendering block 330. The video mixing block 350 further generates and outputs an output video 360 by mixing the video data, either the sensor data 311 or the filtered sensor data 341 with the video overlay.

In one example, the video data is mixed in as a background. The gaze tracking data is then further mixed in as an overlay onto the video data. Finally, the video overlay is then further mixed in as an overlay onto the video data and the gaze tracking data.

Additionally or alternatively, the video overlay at least partially occludes the video data in the mixed video data and the video overlay. In one example, the at least partially occluded parts of the video are blacked out and/or dimmed and/or blurred.

Additionally or alternatively, a degree of occlusion by the overlay of the video data in the mixed video data is dependent on the blink data 321. In one example, the at least partially occluded parts are darker when the eye is closed and lighter when the eye is nearly fully opened. In one further example, the at least partially occluded parts are highly blurred when the eye is closed and less blurred when the eye is nearly fully opened. In one further example, the at least partially occluded parts are highly dimmed when the eye is closed and less dimmed when the eye is nearly fully opened.

Figure 4:
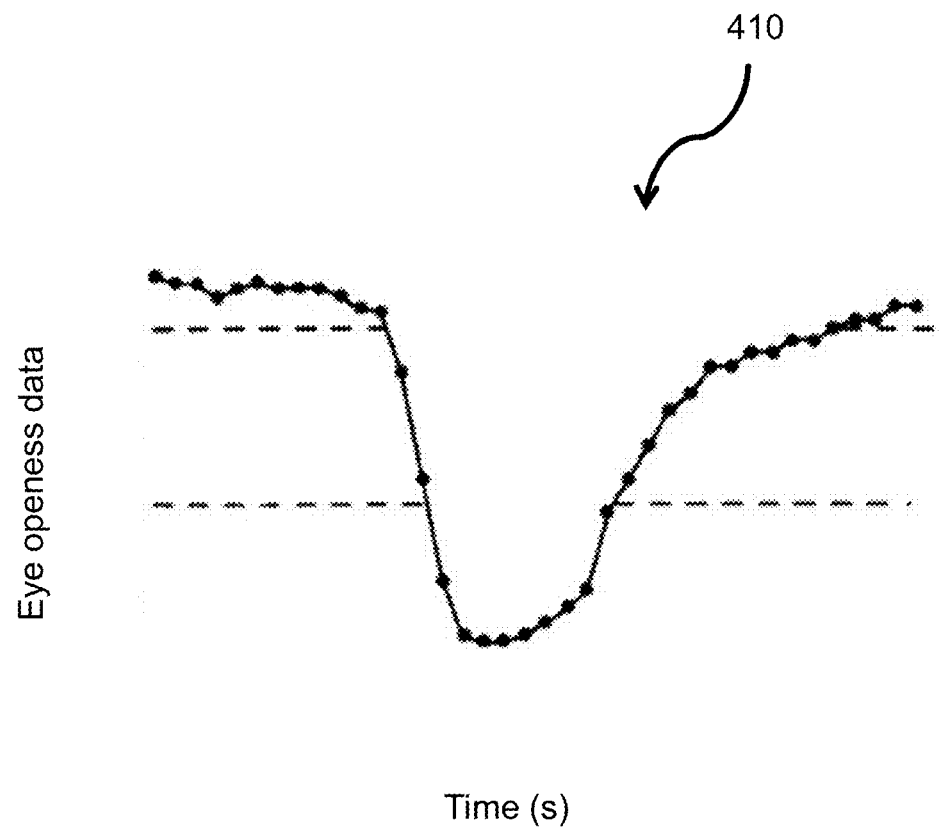
FIG. 4 shows a predetermined blink motion model according to one or more embodiments of the present disclosure.

FIG. 4 shows a predetermined blink motion model 410 according to one or more embodiments of the present disclosure. The blink motion model 410 is illustrated as a two-dimensional diagram with eye openness data values on the vertical axis and elapsed time on the horizontal axis.

In the example, the eye openness data values are indicative of a maximum distance between eyelids in millimeters. The maximum distance may, for example, denote a maximum distance between eyelids along a first axis, where the first axis is perpendicular to a second axis intersecting both corners of an eye of the user. See text relating to FIG. 7A-B items 760, 770 for further details about the first and second axes.

As can be seen from FIG. 4, the blink motion starts with a relatively large distance between eyelids at an open position. The blink motion then has a relatively small distance between eyelids when moving to the closed position. The blink motion then moves back to a relatively large distance between eyelids when moving back from the closed position to the open position.

The predetermined blink motion model 410 may, for example, comprise a plurality of value pairs comprising a normalized time and a corresponding degree of openness of the at least one eye of the user, effectively describing a blink motion of a user's eye over time.

Any other suitable data format may be used without departing from the teaching of the present disclosure.

Figure 5:
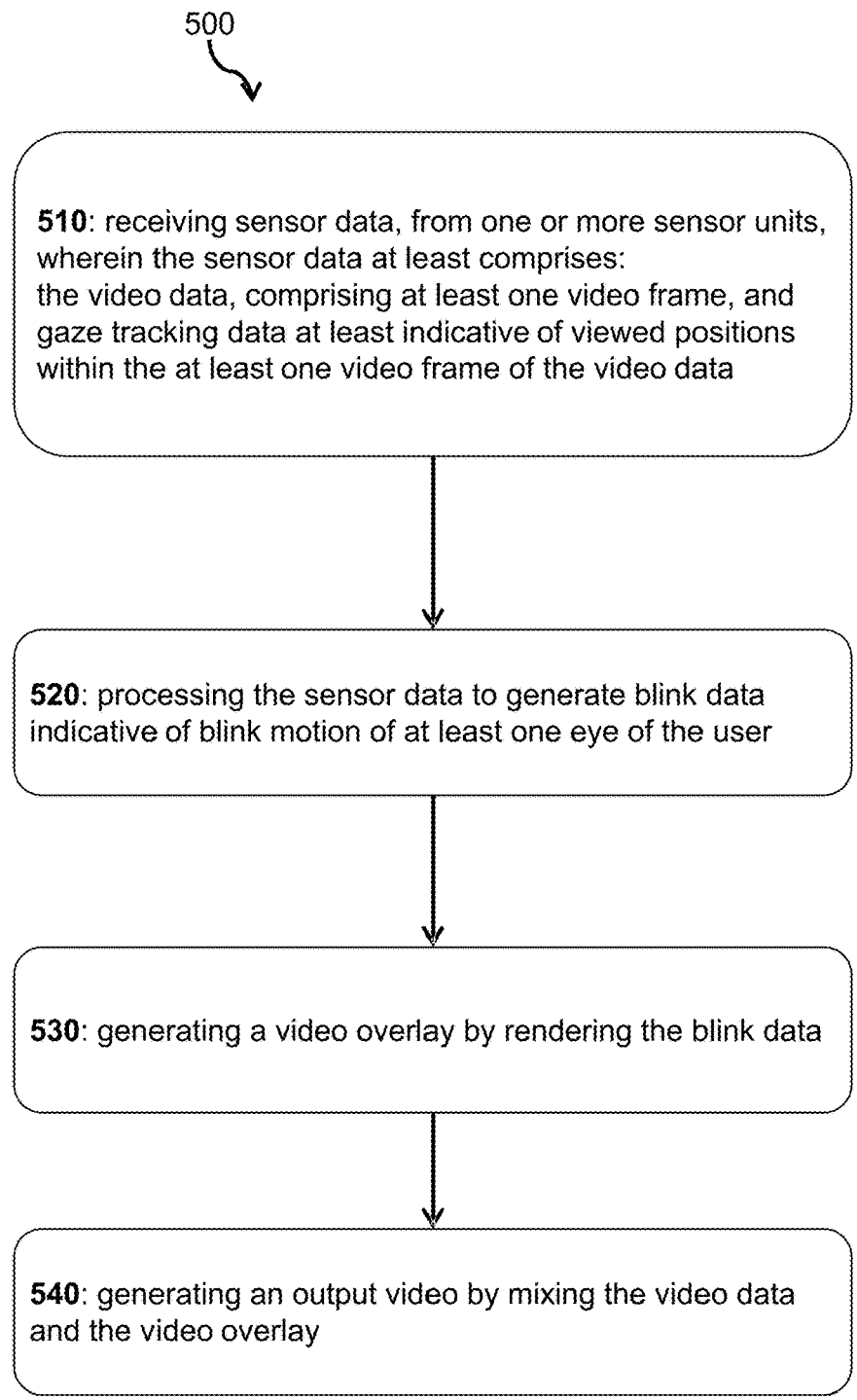
FIG. 5 shows a method according to one or more embodiments of the present disclosure.

FIG. 5 shows a method 500 according to one or more embodiments of the present disclosure. The method 500 may be performed by a computer 620, 630 for generating a video comprising blink data of a user viewing a scene depicted as video data, where the blink data is overlayed on the video data. The steps of the method are further described in relation to FIG. 3. The method comprises:

Step 510: receiving sensor data, where the sensor data at least comprises:
  the video data, comprising at least one video frame 110, and gaze tracking data at least indicative of viewed position(s) 140 within the at least one video frame 110 of the video data.

The sensor data may, for example, be received from one or more sensor units 210-240 comprised in control signals transmitted over a wired or wireless communications network. The sensor data may, in a further example, be received from integrated sensors 200 comprised in control signals transmitted over a wired or wireless communications network. Sensor units are further described in relation to FIG. 2. The step of receiving sensor data is further described in relation to FIG. 3.

Step 520: processing the sensor data to generate blink data indicative of blink motion of at least one eye of the user.

The generated blink data may, for example, comprise a plurality of value pairs comprising a time and a corresponding degree of openness of the at least one eye of the user, i.e., the same or similar information to what is described for the predetermined blink motion model 410, but generated dynamically using the sensor data. The step of generating blink data is further described in relation to FIG. 3.

Step 530: generating a video overlay by rendering the blink data. The step of generating a video overlay is further described in relation to FIG. 3.

Optional step 535: filtering the sensor data 311 to generate filtered sensor data 341.

In one example, the sensor data 311 is received from the sensor block 310 and filtered. Examples of filtering that may be applied to the sensor data 311 are various types of averaging filters to reduce variability between successive/subsequent samples/frames. The filtered sensor data 341 is then sent to the sensor signal filtering block 320 and/or the video mixing block 350.

It is understood that any type of temporal filtering may be applied in order to reduce the noise level of the estimated eye openness/eye openness data in order to achieve a more accurate blink detection/estimation, for example, but not limited to, avoiding false positive detection of a blink presence, or to achieve a smoother or otherwise more easily understood blink visualization. This includes, but is not limited to, filters such as: moving average filters, moving median filters, polynomial-based filters, such as (linear, quadratic, cubic, etc.) splines, or Savitzky-Golay filters. Further, any real-time filtering may be applied, utilizing only data that has been generated up until the given point, and possibly introducing latency to the visualization. Further, any offline filtering may be applied, utilizing data before and after any blink event to enable filtering without shifting the peak closing/opening of the eye in the visualization vis-à-vis its actual occurrence (so-called zero-phase filters).

Step 540: generating an output video 360 by mixing the video data and the video overlay. The step of generating an output video 360 is further described in relation to FIG. 3. The output video 360 may be saved to file, streamed over a communications network, or visualized on a display to one or more users.

In other words, the method may further involve visualizing/presenting the output video 360 on a communicatively coupled display.

In one example, a user is wearing a mobile sensor unit 210 in the form of glasses or goggles. The sensors 200 of the sensor unit 210 capture video depicting a real-world scene 100 the user is viewing. The sensors 200 of the sensor unit 210 further track the coordinates/position of where the gaze of the user is directed in the real-world scene. Effectively, this also provides the coordinates/position of where the gaze of the user is directed in the video frame(s) 110 depicting the scene, as the field of view of the sensors are known and can relate coordinates/positions in the real-world to coordinates/positions in the video frame(s) 110. Sensor data from the sensors 200 of the sensor unit 210 are received. The sensor data may, for example, comprise time, eye position in space (vis-à-vis the eye-tracker), direction of gaze, pupil diameter, 3D position of where the gaze point intersects with the objects 120, 130 in the real-world or on a screen, and eye openness values, e.g., as a millimeter value between the eyelids. The sensor data is processed by generating the blink data by assigning the value pairs of eye openness data comprised in the sensor data 311 to the value pairs of the blink data. A video overlay in the shape of eyelids is generated where movement of the eyelids are animated in proportion to the blink data. An output video 360 is generated with the video of the scene as background and the overlay partially occluding the video, e.g., blacking out areas of the video falling outside the contours of the rendered eyelids. As further described in relation to FIG. 7A-B, the contours of the rendered eyelids may be rendered as parabolas.

In one embodiment of the method 500, the video overlay at least partially occludes the video data in the mixed video data.

Additionally or alternatively, the sensor data further comprises eye openness data indicative of a grade of openness of the at least one eye of the user at a particular time, e.g., as a millimeter value indicative of distance between the eyelids. Distance between the eyelids is further detailed in relation to FIG. 7A-B.

Additionally or alternatively, the blink data is generated dependent on the eye openness data. In other words, the blink motion indicated by the blink data is based on the measured eye openness data in the sensor data.

Additionally or alternatively, processing the sensor data comprises generating time stamped and/or normalized values of the eye openness data in the range [0-1].

If eye openness data is not available in the sensor data, a blink motion may be simulated or estimated.

In one embodiment of the method 500, processing the sensor data comprises generating blink data using time, a predetermined blink interval and a predetermined blink motion model 410. Typically, the predetermined blink interval will be used as the trigger of a blink motion. The predetermined blink motion model 410 may be used to generate blink data indicative of a blink motion. The predetermined blink motion model 410 may comprise a plurality of value pairs comprising a normalized time and a corresponding degree of openness of the at least one eye of the user. Once the predetermined blink interval has passed, the generation of blink data can start by periodically providing current time to the predetermined blink motion model 410 and receiving a corresponding degree of openness of the at least one eye of the user.

If gaze tracking data is temporarily not available in the sensor data, a blink motion may be simulated or estimated.

In one embodiment of the method 500, processing the sensor data comprises determining that the gaze tracking data is indicative of data loss and/or a quality measure of the gaze tracking data being below a quality threshold, and generating blink data using time, and a predetermined blink motion model 410. Typically, the determination of data loss and/or a quality measure of the gaze tracking data being below a quality threshold will be used as the trigger of a blink motion. The quality measure may, for example, be defined as differential or delta values between subsequent values of estimated pupil diameter or between subsequent values of the estimated gaze position. The predetermined blink motion model 410 may be used to generate blink data indicative of a blink motion. The predetermined blink motion model 410 may comprise a plurality of value pairs comprising a normalized time and a corresponding degree of openness of the at least one eye of the user. Once data loss and/or a quality measure of the gaze tracking data being below a quality threshold is detected, the generation of blink data can start by periodically providing current time to the predetermined blink motion model 410 and receiving a corresponding degree of openness of the at least one eye of the user.

Other embodiments of the disclosure allow data loss to trigger a simulation or estimation of the eye closing (closing phase of the blink). Upon receiving valid gaze data again, a simulation of the eye opening is triggered (opening phase of the blink). In other words, in some situations an inaccurate visual representation of some frames of the video at the end of the blink may exist. However, the blink visualization itself will be robust to varying blink durations. That is, the animation of the closing/opening of the eye does not rely on a pre-determined blink duration, only on pre-determined closing/opening velocities.

In one embodiment of the method 500, processing the sensor data comprises generating blink data using closing/opening velocities of the predetermined blink motion model

410. Typically, the data loss and/or a quality measure of the gaze tracking data being below a quality threshold will be used as the trigger of an animated blink motion of the blink motion. The predetermined blink motion model 410 may be used to generate blink data indicative of a closing phase of the blink motion. If the flow of gaze tracking data is restored, this is then this is used as a trigger to start an animated blink motion of the opening phase of the blink.

In one embodiment of the method 500, the overlay is rendered as centered on one of the viewed positions 140. In one example, the video overlay is rendered as an eyelid-like shape, and the eyelid-like shape is centered around one of the viewed positions 140. This is further described in relation to FIG. 8.

In one example, the degree of occlusion is higher (the video overlay is rendered as darker) when the eye is closed and lower (the video overlay is rendered as lighter) when the eye is nearly fully opened. In other words, the video overlay may be rendered as more or less dimmed dependent on the blink data. In a similar manner, the video overlay may be rendered as more or less blurred dependent on the blink data. This is further described in relation to FIG. 9.

Additionally or alternatively, the overlay is rendered as fully transparent in first parts of the overlay and rendered as semi-transparent or opaque in remaining parts 720 of the overlay. Further information on rendering as transparent, semi-transparent or opaque is described in relation to FIG. 7.

In one embodiment of the method 500, rendering the video overlay comprises rendering the blink data as opposite facing parabolas with a focal length proportional to the blink data. Additionally or alternatively, the overlay is rendered as fully transparent within intersecting parts 710 of the opposite facing parabolas and rendered as semi-transparent or opaque in non-intersecting parts 720 of the opposite facing parabolas.

In one embodiment of the method 500, rendered as semi-transparent comprises rendering the non-intersecting parts as blurred and/or dimmed.

In one embodiment, there is provided a method performed by a sensor unit 210-240, 610, 620 for generating a video comprising blink data of a user viewing a scene 100 depicted as video data, wherein the blink data is overlayed on the video data, the sensor unit 210-240 comprising one or more sensors 200, the method comprising:

receiving sensor data from the one or more sensors 200, wherein the sensor data at least comprises:
the video data, comprising at least one video frame 110, and gaze tracking data at least indicative of viewed positions 140 within the scene 100 depicted by the at least one video frame 110 of the video data, and sending the sensor data to a computer 630.

Figure 6:
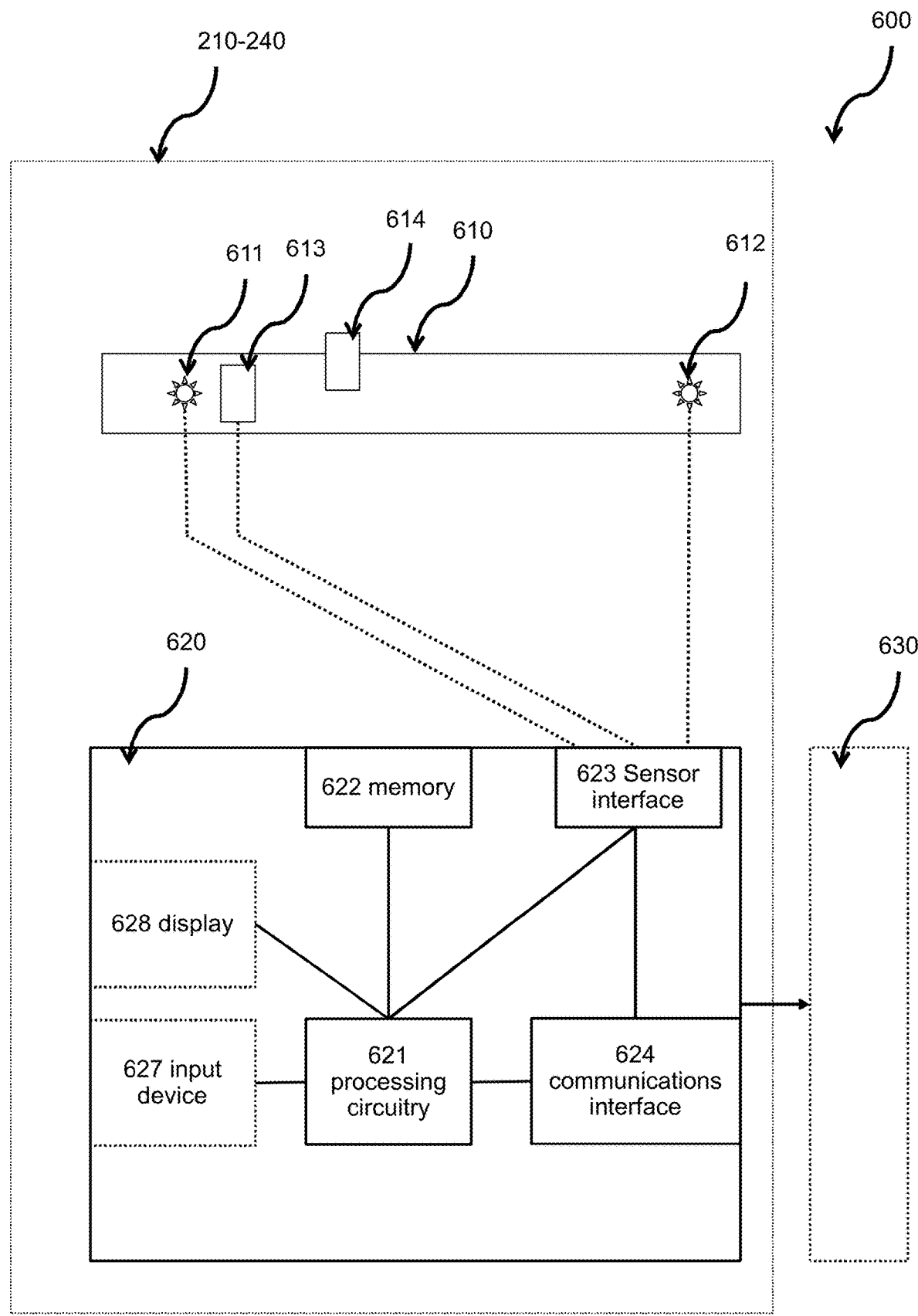
FIG. 6 shows a system according to one or more embodiments of the present disclosure.

FIG. 6 shows a system or eye tracking system 600, according to one or more embodiments of the present disclosure. The system 600 may comprise sensors 610, 200 and a computer 620. The combination of the sensors 610, 200 and the computer 620 is referred to herein as a sensor unit 210-240. Sensor units are further described in relation to FIG. 2. The system 600 may further comprise a second computer 630.

In one example, the sensor unit 210-240 is configured to capture and send sensor data to the second computer 630. The second computer 630 is configured to generate a video comprising blink data of a user viewing a scene 100 depicted as video data, wherein the blink data is overlayed on the video data.

In a further example, the sensor unit 210-240 is configured to capture sensor data and to generate a video comprising blink data of a user viewing a scene 100 depicted as video data, wherein the blink data is overlayed on the video data.

As mentioned previously, it is understood that the method steps described herein can be distributed between the sensor unit 210-240 and second computer 630 according to circumstances, without departing from the teaching of the present disclosure.

The sensors 610, 200 may comprise one or more illuminators 611 and 612 for illuminating the eyes of a user, and at least a first camera/video camera 613 for capturing video/images of the eyes of the user. The sensor 610 may optionally further comprise a second camera/video camera 614 for capturing video/images of the scene 100.

The at least one illuminator 611, 612 and the first and second cameras/video cameras 213, 214 may e.g., be arranged as separate units, integrated into an eye tracking unit 210 or be comprised in a computer 620.

The illuminators 611 and 612 may, for example, be light emitting diodes emitting light in the infrared frequency band, or in the near infrared frequency band. Each camera 613, 614 may, for example, be a camera, such as a complementary metal oxide semiconductor (CMOS) camera or a charged coupled device (CCD) camera. The camera is not limited to be an IR camera or a depth camera or a light-field camera. The shutter mechanism of the camera can either be a rolling shutter or a global shutter.

The first illuminator 611 may be arranged coaxially with (or close to) the first image sensor 613 so that the camera 613 may capture bright pupil images of the user's eyes. Due to the coaxial arrangement of the first illuminator 611 and the first image sensor 613, light reflected from the retina of an eye returns back out through the pupil towards the first camera 613, so that the pupil appears brighter than the iris surrounding it in images where the first illuminator 611 illuminates the eye. The second illuminator 612 is arranged non-coaxially with (or further away from) the first camera 613 for capturing dark pupil images. Due to the non-coaxial arrangement of the second illuminator 612 and the first camera 613, light reflected from the retina of an eye does not reach the first camera 613 and the pupil appears darker than the iris surrounding it in images where the second illuminator 612 illuminates the eye. The illuminators 611 and 612 may, for example, take turns to illuminate the eye, so that every first image is a bright pupil image, and every second image is a dark pupil image.

The eye tracking system 600 also comprises a computer 620. The computer 620 comprises processing circuitry 621 (for example including one or more processors) for processing the images captured by the camera 613. The circuitry 621 may for example, be connected/communicatively coupled to the camera 613 and the illuminators 611 and 612 via a wired or a wireless connection. In another example, the processing circuitry 621 is in the form of one or more processors and may be provided in one or more stacked layers below the light sensitive surface of the camera 613.

The computer 620 according to an embodiment of the present disclosure. The computer 620 may be in the form of a selection of any of one or more Electronic Control Units, a server, an on-board computer, a digital information display, a stationary computing device, a laptop computer, a tablet computer, a handheld computer, a wrist-worn computer, a smart watch, a PDA, a smartphone, a smart TV, a telephone, a media player, a game console, a vehicle-mounted computer system or a navigation device.

The computer 620 may further comprise a communications interface 624, e.g., a wireless transceiver 624 and/or a wired/wireless communications network adapter, which is configured to send and/or receive data values or parameters as a signal to or from the processing circuitry 621, to or from other computers, and/or to or from other communication network nodes or units, e.g., to/from the at least one camera 613 and/or to/from a server. In an embodiment, the communications interface 624 communicates directly between control units, sensors and other communication network nodes or via a communications network. The communications interface 624, such as a transceiver, may be configured for wired and/or wireless communication. In embodiments, the communications interface 624 communicates using wired and/or wireless communication techniques. The wired or wireless communication techniques may comprise any of a CAN bus, Bluetooth, Wi-Fi, GSM, UMTS, LTE or LTE advanced communications network or any other wired or wireless communication network known in the art.

In one or more embodiments, the computer 620 may further comprise a dedicated sensor interface 623, e.g., a wireless transceiver and/or a wired/wireless communications network adapter, which is configured to send and/or receive data values or parameters as a signal to or from the processing circuitry 621, e.g., gaze signals to/from the at least one camera 613.

Further, the communications interface 624 may further comprise at least one optional antenna (not shown in figure). The antenna may be coupled to the communications interface 624 and is configured to transmit and/or emit and/or receive wireless signals in a wireless communication system/network, e.g. send/receive control signals to/from the one or more sensors or any other control unit or sensor. In embodiments including the sensor interface 623, at least one optional antenna (not shown in figure) may be coupled to the sensor interface 623 configured to transmit and/or emit and/or receive wireless signals in a wireless communication system/network.

In one example, the processing circuitry 621 may be any of a selection of processor and/or a central processing unit and/or processor modules and/or multiple processors configured to cooperate with each-other. Further, the computer 620 may further comprise a memory 622.

In one example, the one or more memory 622 may comprise a selection of a hard RAM, disk drive, a floppy disk drive, a magnetic tape drive, an optical disk drive, a CD or DVD drive (R or RW), or other removable or fixed media drive. The memory 222 may contain instructions executable by the processing circuitry to perform any of the methods and/or method steps described herein.

In one or more embodiments the computer 620 may further comprise an input device 627, configured to receive input or indications from a user and send a user-input signal indicative of the user input or indications to the processing circuitry 621.

In one or more embodiments the computer 620 may further comprise a display 628 configured to receive a display signal indicative of rendered objects, such as text or graphical user input objects, from the processing circuitry 621 and to display the received signal as objects, such as text or graphical user input objects.

In one embodiment the display 628 is integrated with the user input device 627 and is configured to receive a display signal indicative of rendered objects, such as text or graphical user input objects, from the processing circuitry 621 and to display the received signal as objects, such as text or graphical user input objects, and/or configured to receive input or indications from a user and send a user-input signal indicative of the user input or indications to the processing circuitry 621.

In embodiments, the processing circuitry 621 is communicatively coupled to the memory 622 and/or the sensor interface 623 and/or the communications interface 624 and/or the input device 627 and/or the display 628 and/or the at least one camera 613. The computer 620 may be configured to receive the sensor data directly from the at least one camera 613 or via the wired and/or wireless communications network.

In a further embodiment, the computer 620 may further comprise and/or be coupled to one or more additional sensors (not shown) configured to receive and/or obtain and/or measure physical properties pertaining to the user or environment of the user and send one or more sensor signals indicative of the physical properties to the processing circuitry 621, e.g., sensor data indicative of ambient light.

The second computer 630, described herein may comprise all or a selection of the features described above for the computer 620.

In one embodiment, a sensor unit 210-410 for generating a video comprising blink data of a user viewing a scene 100 depicted as video data, wherein the blink data is overlayed on the video data, the sensor unit comprising one or more sensors 200, 610 configured to capture sensor data, and a computer 620 comprising a processor; and a memory, said memory containing instructions executable by said processor, whereby said computer is operative to perform the method described herein.

In one embodiment, a system 600 for generating a video comprising blink data of a user viewing a scene 100 depicted as video data, wherein the blink data is overlayed on the video data, the system comprising:

at least one sensor unit 210-410 comprising one or more sensors 200 configured to capture sensor data. The sensor data at least comprise the video data. The video data comprises at least one video frame 110. The sensor data further comprises gaze tracking data at least indicative of viewed positions 140 within the scene 100 depicted by the at least one video frame 110 of the video data. The sensor unit 210-240 further comprising a first computer 620 coupled to the sensors 200 via a communication interface. The system 600 further comprises a second computer 630 communicatively coupled to the first computer 620.

The first computer 620 is operative/configured to send sensor data to the second computer 630, and the second computer 630 is operative to perform the method described herein.

In one embodiment, a computer program product comprising a computer-readable storage medium, the computer-readable storage medium having the computer program above embodied therein.

The computer may further comprise a processor 621; and a memory 622, said memory 622 containing instructions executable by said processor 621, whereby said computer is operative to perform any combination of method steps of the method described herein.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VOIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

Moreover, it is realized by the skilled person that the computer 620, 630 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, encoder, decoder, power supply units, power feeders, communication interfaces, communication protocols, etc. which are suitably arranged together for performing the present solution.

Especially, the processing circuitry 621 of the present disclosure may comprise one or more instances of processor and/or processing means, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processing circuitry" may thus represent a processing circuitry comprising a plurality of processing circuits, such as, e.g., any, some or all of the ones mentioned above. The processing means may further perform data processing functions for inputting, outputting, and processing of data.

FIG. 7A-B illustrates rendering of a video overlay, FIG. 3 item 331, according to one or more embodiments of the present disclosure. In particular, FIG. 7A-B illustrates an example of rendering the video overlay as an eyelid-like shape.

As previously mentioned in relation to FIG. 3 and FIG. 5, the overlay is rendered as fully transparent in first parts 710 of the overlay and rendered as semi-transparent or opaque in remaining parts 720 of the overlay.

FIG. 7A-B illustrates one embodiment of the present disclosure that comprises rendering the blink data in an eyelid-like shape, i.e., forming eyelid like shapes with varying degree of eye-openness. More specifically, rendering the blink data as at least sections of opposite facing parabolas 730, 740 with a focal length proportional to the blink data. The focal length is typically relatively large when the eye of the user is nearly fully open, and relatively small when the eye of the user is nearly closed. In other words, a parabola with a larger focal length has a higher curvature than a parabola with a smaller focal length. The outline of a fully open eye would typically have a larger/greater focal length than the outline of a nearly closed eye.

It is understood that this embodiment is not limiting, and the blink data may be rendered in any other suitable shutter like pattern, e.g., in the form of diaphragm shutter focal-plane shutters. The motion of the shutter when moving from fully open, to fully shut and back to fully open, can then be said to be equivalent to the blink motion in the present disclosure.

In FIG. 7A and FIG. 7B, the blink data is rendered as an eyelid-like shape or area defined by the two intersecting points 751, 753, of the two opposite facing parabolas and the corresponding vertex 752, 754 of the two opposite facing parabolas 730, 740. This effectively forms an eyelid-like shape. A first vertical axis 760 intersects each corresponding vertex 752, 754 of the two opposite facing parabolas 730, 740. A second axis 770, arranged perpendicular to the first axis is intersecting both corners/of the two intersecting points 751, 753 the eye of the user. The eye openness data values are typically indicative of a maximum distance between eyelids in millimeters along the first axis along outlining contours of the eyelids.

The components used to render the video overlay 311 are shown to the left and the resulting rendered overlay is shown to the right in FIG. 7A and FIG. 7B.

In one embodiment, the size/resolution of the video overlay is the same as for the video frame 110/video data.

FIG. 7A illustrates rendering of a blink motion where the eye is nearly fully open. The two opposite facing parabolas 730, 740 are rendered with relatively large focal length when the eye of the user is nearly fully open. As can be seen in FIG. 7A, the video overlay is rendered as fully transparent in first parts 710 of the overlay and rendered as semi-transparent or opaque in remaining parts 720 of the overlay. The fully transparent first parts 710 are formed by the areas defined by the two opposite facing parabolas 730, 740, the two intersecting points 751, 753 and the corresponding vertex 752, 754 of the two opposite facing parabolas 730, 740. The representation shown to the right in FIG. 7A is further cropped with the outline/limitations of the video frame 110. Any other parts of the video overlay are assigned to the remaining parts 720 of the overlay.

FIG. 7B illustrates rendering of a blink motion where the eye is nearly fully closed. The two opposite facing parabolas 730, 740 are rendered with relatively small focal length when the eye of the user is nearly fully open. As can be seen in FIG. 7A, the video overlay is rendered as fully transparent in first parts 710 of the overlay and rendered as semi-transparent or opaque in any remaining parts 720 of the overlay. The fully transparent first parts 710 are formed by the areas defined by the two opposite facing parabolas 730, 740, the two intersecting points 751, 753 and the corresponding vertex 752, 754 of the two opposite facing parabolas 730, 740. Any other parts of the video overlay are assigned to the remaining parts 720 of the overlay.

Figure 8A:
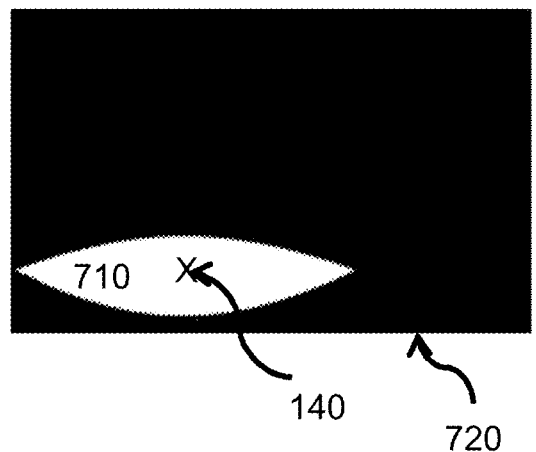
FIG. 8A-B illustrates embodiments involving rendering the video overlay as centered on one of the viewed positions.
Figure 8B:
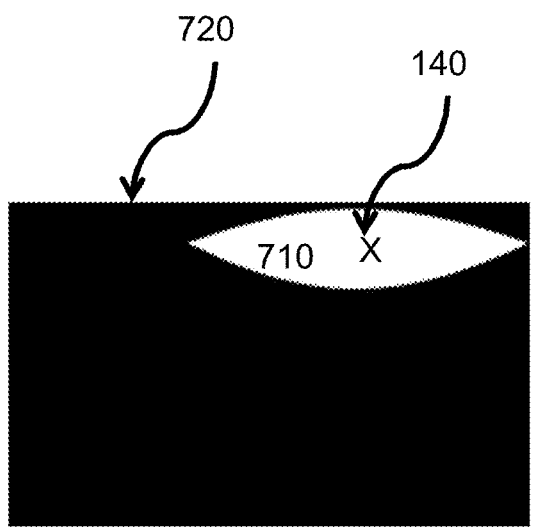

FIG. 8A-B illustrates embodiments involving rendering the video overlay as centered on one of the viewed positions 140.

FIG. 8A illustrates rendering of the video overlay when the user is viewing a position in the lower left corner of the depicted scene 110.

FIG. 8B illustrates rendering of the video overlay when the user is viewing a position in the top right corner of the depicted scene 110.

As can be seen from FIG. 8A and FIG. 8B, the eyelid-like shape or area effectively follows the viewed position 140.

Figure 9A:
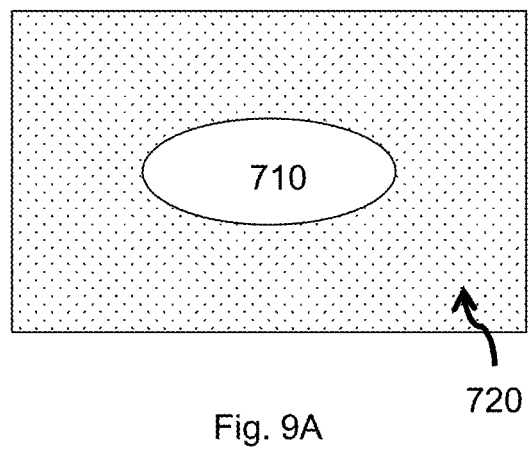
FIG. 9A-B illustrates embodiments involving rendering the video overlay with a varying degree of occlusion, where the varying degree of occlusion is dependent on the blink data.
Figure 9B:
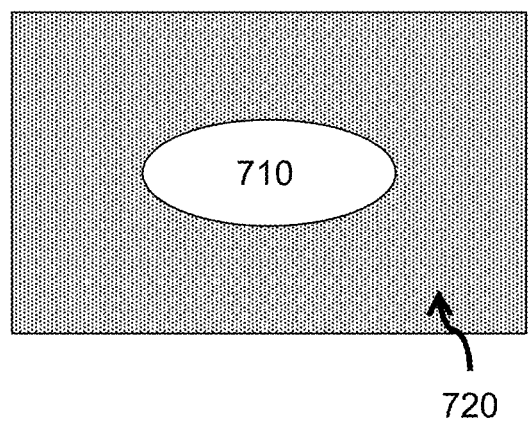

FIG. 9A-B illustrates embodiments involving rendering the video overlay with a varying degree of occlusion, where the varying degree of occlusion is dependent on the blink data 321.

FIG. 9A illustrates rendering of the video overlay the video overlay with a relatively low degree of occlusion indicative of that the eye of the user is nearly fully open. This would typically correspond to relatively lightly dimmed or relatively lightly blurred.

FIG. 9B illustrates rendering of the video overlay the video overlay with a relatively high degree of occlusion indicative of that the eye of the user is nearly fully closed. This would typically correspond to relatively highly dimmed or relatively highly blurred.

Finally, it should be understood that the invention is not limited to the embodiments described above, but also relates to and incorporates all embodiments within the scope of the appended independent claims.

What is claimed is:

1. A method performed by a computer for generating a video comprising blink data of a user viewing a scene depicted as video data, wherein the blink data is overlayed on the video data, the method comprising:
   receiving sensor data, wherein the sensor data at least comprises:
      the video data, comprising at least one video frame, and
      gaze tracking data at least indicative of viewed positions within the scene depicted by the at least one video frame of the video data;
   processing the sensor data to generate blink data indicative of blink motion of at least one eye of the user;
   generating a video overlay by rendering the blink data; and
   generating an output video by mixing the video data and the video overlay.

2. The method according to claim 1, wherein the video overlay at least partially occludes the video data in the mixed video data.

3. The method according to claim 2, wherein a degree of occlusion by the overlay of the video data in the mixed video data is dependent on the blink data.

4. The method according to claim 1, wherein the sensor data further comprises eye openness data indicative of a grade of openness of the at least one eye of the user at a particular time.

5. The method according to claim 4, wherein the blink data is generated dependent on the eye openness data.

6. The method according to claim 4, wherein processing the sensor data comprises generating time-stamped and/or normalized values of the eye openness data in the range [0-1].

7. The method according to claim 1, wherein processing the sensor data comprises generating blink data using time, a predetermined blink interval and a predetermined blink motion model.

8. The method according to claim 1, wherein processing the sensor data comprises:
   determining that the gaze tracking data is indicative of data loss and/or a quality 4 measure of the gaze tracking data being below a quality threshold; and
   generating blink data using time and a predetermined blink motion model.

9. The method according to claim 1, wherein the overlay is rendered as centered on one of the viewed positions.

10. The method according to claim 1, wherein rendering the video overlay comprises rendering the blink data as a shutter-like pattern.

11. The method according to claim 10, wherein the shutter-like pattern is rendered in the form of an eyelid-like shape, a diaphragm shutter or a focal-plane shutter.

12. The method of claim 1, further comprising sending the sensor data by a first computer of a system to a second computer of the system, wherein the receiving step, the processing step, the generating the video overlay step, and the generating the output video step are each performed by the second computer.

13. A sensor unit for generating a video comprising blink data of a user viewing a scene depicted as video data, wherein the blink data is overlayed on the video data, the sensor unit comprising:
   one or more sensors configured to capture sensor data, and
      a computer comprising a processor; and
   a memory, said memory containing instructions executable by said processor, whereby said computer is operative to perform operations comprising:
   receiving sensor data, wherein the sensor data at least comprises:
      the video data, comprising at least one video frame, and
      gaze tracking data at least indicative of viewed positions within the scene depicted by the at least one video frame of the video data;
   processing the sensor data to generate blink data indicative of blink motion of at least one eye of the user;
   generating a video overlay by rendering the blink data; and
   generating an output video by mixing the video data and the video overlay.

14. A system for generating a video comprising blink data of a user viewing a scene depicted as video data, wherein the blink data is overlayed on the video data, the system comprising:
   at least one sensor unit comprising one or more sensors configured to capture sensor data, wherein the sensor data at least comprises the video data, comprising at least one video frame, and gaze tracking data at least indicative of viewed positions within the scene depicted by the at least one video frame of the video data;
   a first computer; and
   a second computer, wherein the first computer is operative to send sensor data to
   the second computer, and the second computer is operative to perform operations comprising:
   receiving sensor data, wherein the sensor data at least comprises: the video data, comprising at least one video frame, and gaze tracking data at least indicative of viewed positions within the scene depicted by the at least one video frame of the video data;
   processing the sensor data to generate blink data indicative of blink motion of at least one eye of the user;
   generating a video overlay by rendering the blink data; and
   generating an output video by mixing the video data and the video overlay.

15. A non-transitory computer-readable storage medium, the non-transitory computer-readable storage medium having computer-executable instructions that, when executed by a processing device, cause the processing device to perform operations comprising:
   receiving sensor data, wherein the sensor data at least comprises:
      the video data, comprising at least one video frame, and gaze tracking data at least indicative of viewed positions within the scene depicted by the at least one video frame of the video data;

processing the sensor data to generate blink data indicative of blink motion of at least one eye of the user;

generating a video overlay by rendering the blink data; and generating an output video by mixing the video data and the video overlay.

* * * * *